US010452979B2

(12) United States Patent
Park (10) Patent No.: US 10,452,979 B2
(45) Date of Patent: Oct. 22, 2019

(54) CONVOLUTION NEURAL NETWORK TRAINING APPARATUS AND METHOD THEREOF

(71) Applicant: Samsung Electronics Co., Ltd., Suwon-si (KR)

(72) Inventor: Hyoung Min Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 832 days.

(21) Appl. No.: 14/960,942

(22) Filed: Dec. 7, 2015

(65) Prior Publication Data

US 2016/0162782 A1 Jun. 9, 2016

(30) Foreign Application Priority Data

Dec. 9, 2014 (KR) .................. 10-2014-0175946

(51) Int. Cl.
*G06N 3/08* (2006.01)
*G06N 3/04* (2006.01)

(52) U.S. Cl.
CPC ........... *G06N 3/082* (2013.01); *G06N 3/0454* (2013.01)

(58) Field of Classification Search
CPC ........................ G06N 3/082; G06N 3/0454
See application file for complete search history.

(56) References Cited

U.S. PATENT DOCUMENTS

| 8,064,726 B1* | 11/2011 | d'Eon ............... G06F 17/15 345/615 |
| 8,345,984 B2 | 1/2013 | Ji et al. |
| 8,452,719 B2 | 5/2013 | Liano et al. |
| 8,631,017 B2 | 1/2014 | Scholz et al. |
| 9,767,410 B1* | 9/2017 | Guevara ............ G06N 3/08 |
| 2012/0121142 A1 | 5/2012 | Nagesh |
| 2013/0121548 A1 | 5/2013 | Kovalan et al. |
| 2014/0112544 A1 | 4/2014 | Yu et al. |
| 2016/0140424 A1* | 5/2016 | Wang ................. G06K 9/66 382/156 |
| 2016/0148078 A1* | 5/2016 | Shen ................. G06K 9/66 382/158 |

OTHER PUBLICATIONS

Speeding up Convolutional Neural Networks with Low Rank Expansions—2014 Jaderberg et al.*
Exploiting Linear Structure Within Convolutional Networks for Efficient Evaluation—2014 Denton et al.*
Low-Rank Approximations for Conditional Feedforward Computation in Deep Neural Networks—2014 Davis et al.*
(Continued)

*Primary Examiner* — Luis A Sitiriche
*Assistant Examiner* — Ababacar Seck
(74) *Attorney, Agent, or Firm* — NSIP Law (57) ABSTRACT

An apparatus and method of training a convolutional neural network (CNN) are provided. A method of training a CNN including a plurality of convolution layers stored in a memory involves approximating, using a processor, a convolution layer among the plurality of convolution layers using a low-rank approximation; reducing the number of output reconstruction filters of the approximated convolution layer; and modifying a structure of the CNN based on an approximation result and the reduced number of output reconstruction filters.

15 Claims, 10 Drawing Sheets

(56) References Cited

OTHER PUBLICATIONS

Jaderberg, Max, et al., "Speeding Up Convolutional Neural Networks With Low Rank Expansions." arXiv preprint arXiv: 1405.3866, 2014, (12 pages).

Denton, Emily L., et al., "Exploiting Linear Structure Within Convolutional Networks for Efficient Evaluation." arXiv preprint arXiv:1405.3866, 2014, (11 pages).

* cited by examiner

CONVOLUTION NEURAL NETWORK TRAINING APPARATUS AND METHOD THEREOF

CROSS-REFERENCE TO RELATED APPLICATION(S)

This application claims the benefit under 35 USC 119(a) of Korean Patent Application No. 10-2014-0175946, filed on Dec. 9, 2014, in the Korean Intellectual Property Office, the entire disclosure of which is incorporated herein by reference for all purposes.

BACKGROUND

1. Field

The following description relates to a machine learning technology, such as an apparatus and method for training a convolutional neural network (CNN).

2. Description of Related Art

Deep learning technologies have gained attention from a wide range of fields. Among the deep learning technologies, a convolutional neural network (CNN) is gaining special attention in the field of object recognition.

A CNN is a model that emulates the human brain based on the assumption that the human brain perceives an object of interest based on the result of complex computations of basic features that have been extracted from the object. In a CNN, a variety of filters for extracting features of an image through a convolution operation, and pooling or non-linear activation functions to add nonlinearities, are used altogether to learn to recognize an object.

In addition, the larger the CNN model, the more precisely it may recognize objects. Thus, for object recognition, a model that is larger than generally required is used, which causes an increase in the amount of time spent in computation and recognition of the object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of training a convolutional neural network (CNN) including a plurality of convolution layers stored in a non-transitory memory is provided, the method involving approximating, using a processor, a convolution layer among the plurality of convolution layers using a low-rank approximation; reducing the number of output reconstruction filters of the approximated convolution layer; modifying a structure of the CNN based on an approximation result and the reduced number of output reconstruction filters; and training the modified CNN.

After the training of the modified CNN, the general aspect of the method may further involve performing the operations of sequentially approximating convolution layers that follow the approximated convolution layer, reducing the number of output reconstruction filters of the currently approximated convolution layer and modifying the structure of the CNN, and training the modified CNN.

After the training of the modified CNN, the general aspect of the method may further involve classifying image data using the trained CNN, and in response to an accuracy of the classification not satisfying a designated criteria, performing the operations of reducing the number of output reconstruction filters, modifying the structure of the CNN, and training the modified CNN.

The general aspect of the method may further involve modifying a structure of at least one convolution layer that follows the approximated convolution layer, in which the structure of the CNN is modified based on a result of the modifying of the structure of said at least one convolution layer.

The structure of the CNN may be modified by changing the number of convolution filters of the at least one convolution layer that follows the approximated convolution layer.

After the training of the modified CNN, the general aspect of the method may further involve classifying image data using the trained CNN, and in response to an accuracy of the classification not satisfying a designated criteria, performing the operations of modifying the structure of at least one convolution layer that follows the approximated convolution layer, modifying the structure of the CNN, and training the modified CNN.

One convolution layer among the plurality of convolution layers may be approximated into one or more input conversion filters, one or more convolution filters, and one or more output reconstruction filters.

The input conversion filter may be configured to reduce the number of channels of input data, the convolution filter may be configured to perform a convolution operation on input data having a reduced number of channels, and the output reconstruction filter may be configured to restore a convolution operation result to have the same number of channels as the number of channels of the convolution layer.

In another general aspect, a non-transitory computer-readable medium storing instructions that, when executed by a computer processor, causes the computer processor to train a convolution neural network stored in a non-transitory memory according to the general aspect of the method described above is provided.

In yet another general aspect, an apparatus for training a convolution neural network (CNN) including a plurality of convolution layers stored in a non-transitory memory is provided, the apparatus including an approximation module configured to approximate a convolution layer among the plurality of convolution layers using a low-rank approximation, a filter count changer configured to reduce the number of output reconstruction filters of the approximated convolution layer, and a training module configured to modify a structure of the CNN based on an approximation result and the reduced number of output reconstruction filters and to train the modified CNN.

The approximation module may be configured to sequentially approximate another convolution layer that follows the approximated convolution layer in response to the modified CNN being trained.

The general aspect of the apparatus may further include a classifier configured to classify image data using the trained CNN, and the filter count changer may re-change the number of output reconstruction filters in response to an accuracy of the classification not satisfying a designated criteria.

The general aspect of the apparatus may further include a layer structure modifier configured to modify a structure of at least one convolution layer that follows the approximated convolution layer, and the training module may modify the structure of the CNN based on a result of modifying the structure of said convolution layer that follows the approximated convolution layer.

The layer structure modifier may be configured to modify the structure of at least one convolution layer by changing the number of convolution filters of said convolution layer.

The general aspect of the apparatus may further include a classifier configured to classify image data using the trained CNN, and the layer structure modifier may be configured to re-modify the structure of the at least one convolution layer that follows the approximated convolution layer in response to an accuracy of the classification not satisfying a designated criteria.

The approximation module may be configured to approximate the convolution layer among the plurality of convolution layers into one or more input conversion filters, one or more convolution filters, and one or more output reconstruction filters.

The input conversion filter may be configured to reduce the number of channels of input data, the convolution filter may be configured to perform a convolution operation on input data having a reduced number of channels, and the output reconstruction filter may be configured to restore a convolution operation result to have the same number of channels as the number of channels of the convolution layer.

In yet another general aspect, an apparatus for training a neural network includes a non-transitory memory storing a convolution neural network (CNN) including a plurality of convolution layers, and a processor configured to approximate a convolution layer among the plurality of convolution layers using a low-rank approximation, reduce a number of output reconstruction filters of the approximated convolution layer, modify a structure of the CNN based on a result of the approximating of the convolution layer and the reduced number of output reconstruction filters, and train the modified CNN stored in the non-transitory memory.

The apparatus may train the modified CNN by retrieving input image data from a training data memory storage.

The processor may be further configured to classify input image data retrieved from a training data memory storage by using the modified CNN, and further modify the modified CNN in response to an accuracy of the classification not satisfying a designated criteria.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
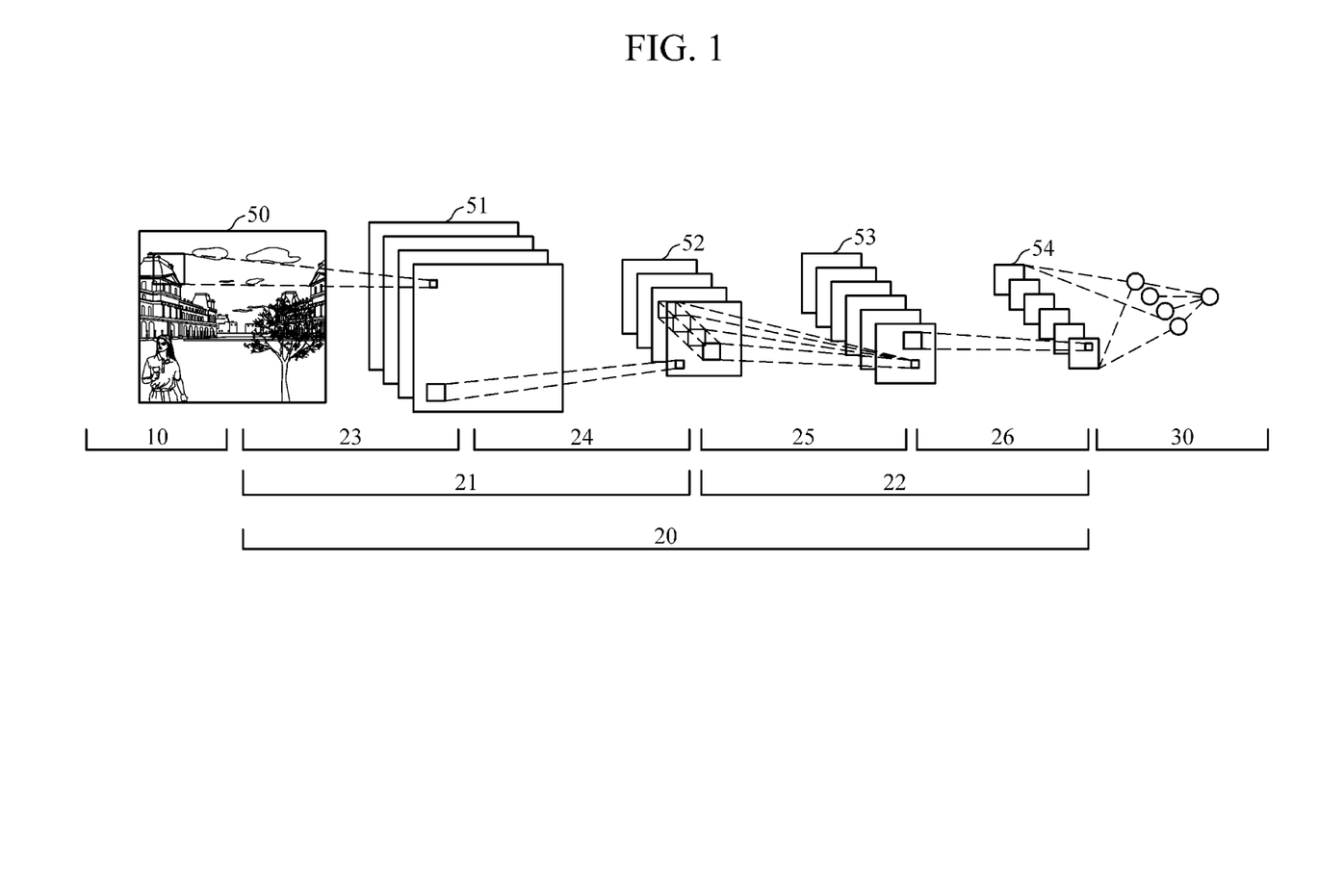
FIG. 1 is a diagram illustrating an example of a convolutional neural network (CNN).

FIG. 1 illustrates an example of a convolutional neural network (CNN).

Referring to FIG. 1, a CNN includes an input layer 10, a hidden layer 20, and an output layer 30. The input layer 10 receives input image data 50. The hidden layer 20 consists of a plurality of multilayers 21 and 22. In this example, the multilayer 21 includes a convolution layer 23 and a sub-sampling layer 24, and the multilayer 22 includes a convolution layer 25 and a sub-sampling layer 26. Convolution layers 23 and 25 perform a convolution operation on image data 50 and 52 that are input to the respective layers 21 and 22, and generate feature maps 51 and 53. The feature map refers to image data that represents various features of the input image data 50. The sub-sampling layers 24 and 26 reduce the respective feature maps 51 and 53 through sampling or pooling. The output layer 30 may classify the image data 50 by combining various features represented in the feature map 54. At this time, the output layer 30 may consist of fully connected layers.

The configuration of a CNN (e.g., the number of hidden layers, the number and size of filters in each layer, and the like) is generally determined in advance, and a weight matrix for filters in each layer is set to an appropriate value, using data that have already been classified. Such classified is referred to as 'training data', and the procedures for determining the weight matrix for filters are referred to as "training".

The diagram illustrated in FIG. 1 shows an example of a configuration of a CNN that includes a first convolution layer 23 and a second convolution layer 25. The first convolution layer 23 generates four feature maps 51 using four convolution filters, and the second convolution layer 25 generates six feature maps 53 using six convolution filters. The four feature maps 51 have four channels, and the six feature maps 53 have six channels.

Referring to FIG. 1, an input image data 50 including an image of a scene is processed by the CNN to extract information regarding the content. The input image data 50 may be obtained real time, using an image sensor, such as a video camera, a camera or a photodetector, or may be retrieved from a non-transitory memory, data buffer, memory register and the like. The input image data 50 may include, for example, information regarding a color image, a black and white image, a graphical image, a photograph, a 2-D image or a 3-D image. The image may be a static image or a dynamic image that changes with the passage of time. While an example of an image having a scene is illustrated in FIG. 1, various applications are possible. For instance, according to one example, the CNN may be applied to a robot to recognize objects in its surroundings by configuring the robot to obtain a video image of its surrounding real time and providing the video image as the input image data 50. In another example, a camera may be used to automate the recognition of handwritten addresses on mails by providing the images from the camera as the input image data 50.

According to one example, the input layer 10, the hidden layer 20, and the output layer 30 are implemented as data structures stored in a hardware component of a computer, such as a computer memory, supplemented by various processors that assign values to the data structures. For example, the input layer 10 may include an input data file that is stored in a memory, the convolution layers 23, 25, and the subsampling layers 24, 26 may include data structures that store the feature maps 51, 52, 53, 54 in a memory. The output layer 30 may include a data structure that includes nodal structures in a memory. The output layer 30 may output a recognition result of the processing performed by the CNN.

In one example of the CNN in which a robotic eye perceives a scene through a video camera, the recognition result may include a recognition of objects such as a house or a tree and the locations of the objects with respect to the location of the robot. In an example in which a camera is used to recognize handwritten addresses, the recognition result may include the recognized characters obtained from the input image data 50. In an example in which a 3D MRI scan of an organ is processed, the recognition result may include the location of vessels, tissues or ligands. The recognition result may be stored in a memory, provide to generate a command for a robot, output to a user, displayed on a monitor, and the like.

Figure 2:
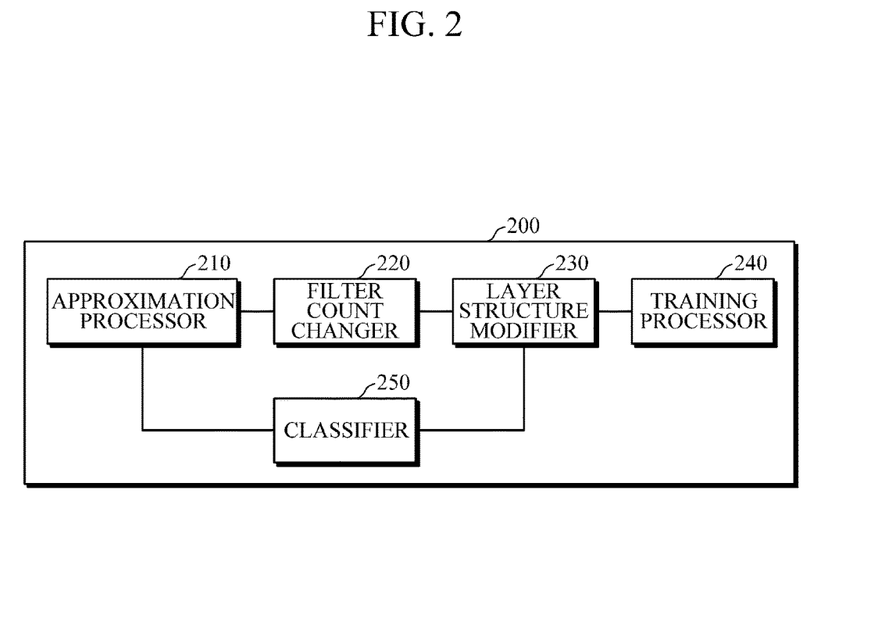
FIG. 2 is a block diagram illustrating an example of a CNN approximation training apparatus.

FIG. 2 illustrates an example of a CNN approximation apparatus.

Referring to FIG. 2, the apparatus 200 used for training a CNN (hereinafter, referred to as a "training apparatus") includes an approximation processor 210, a filter count changer 220, a layer structure modifier 230, a training processor 240, and a classifier 250. The approximation processor 210, the filter count changer 220, the layer structure modifier 230, the training processor 240, and the classifier 250 may each include one or more computer processors and memory.

The approximation processor 210 approximates a convolutional filter w of a learned convolution layer into an input conversion filter α, a convolution filter β, and an output reconstruction filter γ by using a low-rank approximation method. The convolutional filter w, the input conversion filter α, the convolution filter β, and the output reconstruction filter γ are each stored in a memory. At this time, the approximation processor 210 may divide a weight matrix of the convolution filter w into a matrix of the input conversion filter α, a matrix of the convolution filter β, and a matrix of the output reconstruction filter γ by using outer-product decomposition.

In this example, the input conversion filter α reduces the number of channels of input image data, and the convolution filter β generates feature maps by using convolution on the input image data with a reduced number of channels. The generated features maps may be stored in a memory. In addition, the output reconstruction filter γ restores the number of channels of the feature maps generated by the convolution filter β to the same number as those of the output image data from the convolution filters w.

The number of input conversion filters α and the number of convolution filters β may be determined beforehand by a user, stored in a memory and retrieved from the memory by the approximation processor 210.

The filter count changer 220 reduces the number of output reconstruction filters γ. For example, assuming that an approximated convolution layer has six output reconstruction filters γ, the filter count changer 220 may change the number of output reconstruction filters γ to one ranging from 1 to 5. As such, the number of output reconstruction filters γ may be changed to the arbitrary number or it may also be changed by a user.

The layer structure modifier 230 modifies the structures of convolution layers (hereinafter, referred to as "following convolution layers") that follow an approximated convolution layer. According to one example, in order to modify their structures, the layer structure modifier 230 changes the number of convolution filters of one or more following convolution layers. For example, assuming that the CNN consists of three convolution layers (a first convolution layer, a second convolution layer, and a third convolution layer) and that the approximation processor 210 has approximated the first convolution layer, the layer structure modifier 230 may change the number of convolution filters of at least one of the second and third convolution layers in order to modify the structure of the pertinent convolution layer(s). At this time, the convolution filter count may be changed to the arbitrary number or changed by a user.

The training processor 240 changes the structure of the CNN based on an approximation result from the approximation processor 210, the changed number of output reconstruction filters γ from the filter count changer 220, and the result of modifying the structure of the following convolution layer(s) from the layer structure modifier 230; said processor may then train the CNN of the modified structure by using training data. At this time, the training processor 240 may fix the values of input conversion filters α and convolution filter β and then train the CNN of the modified structure.

The result of previously training cannot be applied to a modified CNN once the structure of the CNN has been changed via approximation of a convolution layer and the structure(s) of the following convolution layer(s) has been modified subsequent to the change made in the number of output reconstruction filters γ. Therefore, a process to train the modified CNN is required, and the training processor 230 performs this process.

According to an example, the training processor 240 trains the structure-modified CNN, using backpropagation.

Generally, the backpropagation learning method is a method of efficiently implementing a gradient descent method, which is one of optimization techniques, to minimize a loss function shown as a function with an answer of the given data and a predicted value of a current model. The gradient descent method is a method of finding a minimum value by repeating multiple times a process of multiplying a determined number by and subtracting the determined number from a current location's gradient that is acquired after substituting the current weight value for a gradient vector partially-differentiated based on each changeable weight value. Such a method of calculating a gradient vector may be referred to as a backpropagation learning method.

The training processor 240 may use a large number of pre-stored input image data that are paired with recognition results to train the CNN.

Using the trained CNN, the classifier 250 classifies image data into classes. At this time, the result of said classification may include the class of the image data as well as the classification accuracy.

According to one example, if the classification accuracy of the classifier 250 does not meet designated criteria, the filter count changer 220 may change the number of output reconstruction filters γ again so that they are less than the number of output reconstruction filters γ resulting from approximation. In this case, the training processor 240 takes into account the changes made to the output reconstruction filter count γ and, based on this, is able to re-modify the structure of the CNN. In addition, the training processor 240 is able to train the structure-remodified CNN. Thus, the training apparatus 200 is one which can find a structure for the CNN that provides a high degree of the classification accuracy by adjusting the number of output reconstruction filters γ.

According to one example, in response to a determination that the classification accuracy from the classifier 250 does not meet the designated criteria, the layer structure modifier 230 re-modifies the structures of the following convolution layers. In this case, the training processor 240 takes into account the modifications made to the following convolution layers and is able to re-modify the structure of the CNN based on them. In addition, the training processor 240 is able to train the structure-modified CNN. Thus, the training apparatus 200 is one which can also find the structure for the CNN that provides a high degree of classification accuracy by modifying the structure of the following convolution layers.

The aforementioned structural changes and modifications may also take place by a user in that, according to user input, the filter count changer 220 may change the number of output reconstruction filters γ and the layer structure modifier 240 may modify the structure of the following convolution layers.

According to one example, the training apparatus 200 performs operations on some or all convolution layers of the CNN. In this example, the operations include sequential approximation of the layers, changing the number of output reconstruction filters γ, changing the structure of the following convolution layer(s), and iterative training. For instance, the approximation processor 210, the filter count changer 220, the layer structure modifier 230, and the training processor 240 may be implemented to perform the aforementioned operations on some or all convolution layers.

Such operations will be described in detail with reference to FIGS. 4A to 4D.

Figure 3:
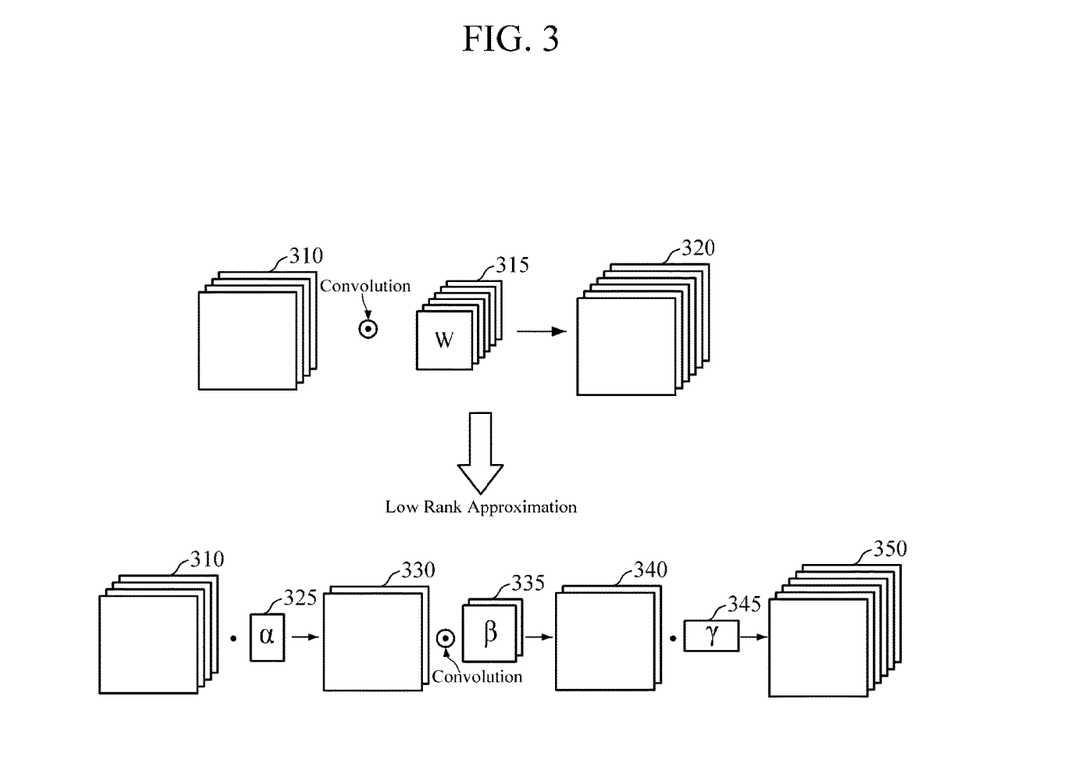
FIG. 3 is a diagram illustrating an approximation performed by an example of an approximation processor according to FIG. 2.

FIG. 3 illustrates the operation of approximating convolution layers according to an example of the approximation processor illustrated in FIG. 2.

Referring to FIG. 3, the example assumes that a convolution layer that receives 4-channel input image data 310 and outputs 6-channel output image data 320 (i.e., six feature maps) using six convolution filters w 315 is approximated. In this example, by using low-rank approximation, the approximation processor 210 is able to approximate the six convolution filters w 315 into one input conversion filter α 325, which in turn, reduces the number of channels of the input image data 310 from 4 to 2; two convolution filters β 335 that perform a convolution operation on 2-channel image data 330 that has been output from the input conversion filter α; and an output reconstruction filter γ 345 that reconstructs 2-channel image data 340 that was output from the convolution filters β 335 to six channels, so that it may have the same number of channels as before approximation. In this case, filter counts used for approximation, the input conversion filter count α 325 and the convolution filter count β, may be determined beforehand by a user.

Hereinafter, the operations of the training apparatus of FIG. 2 will be described in detail with reference to FIGS. 4A to 4D.

Figure 4A:
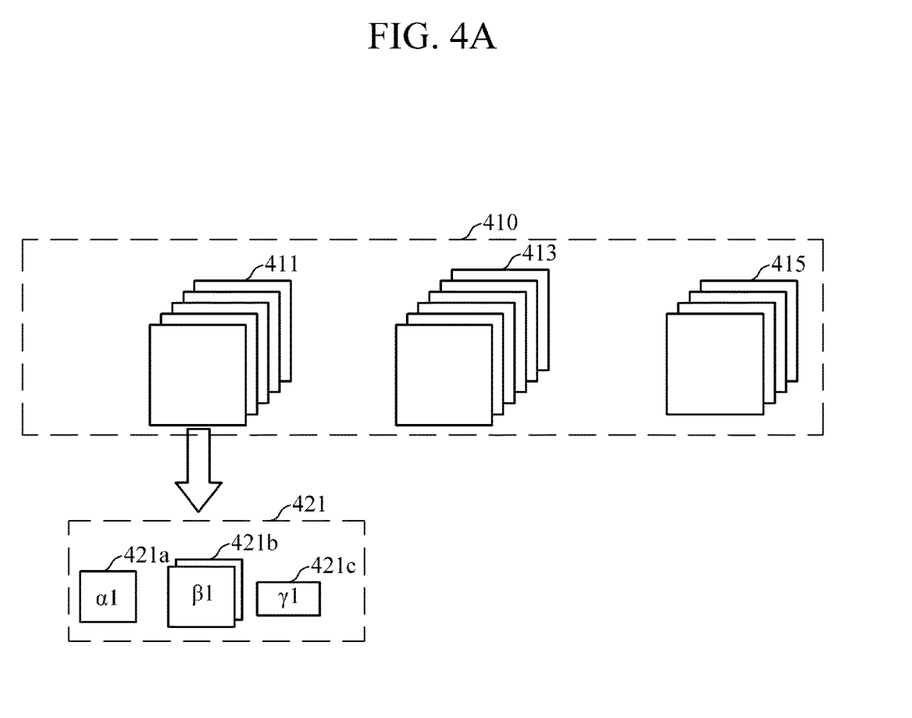
FIGS. 4A to 4D are diagrams showing operations performed by an example of a training apparatus according to FIG. 2.

Referring to FIGS. 2 and 4A, the approximation processor 210 may approximate the first convolution layer 411 of the CNN 410 into an input conversion filter α1 421a, two convolution filters β1 421b, and an output reconstruction filter γ1 421c, by using low-rank approximation. In this case, the number of convolution filters β1 421b may be set by a user to be less than the number of convolution filters of the first convolution layer 411.

Figure 4B:
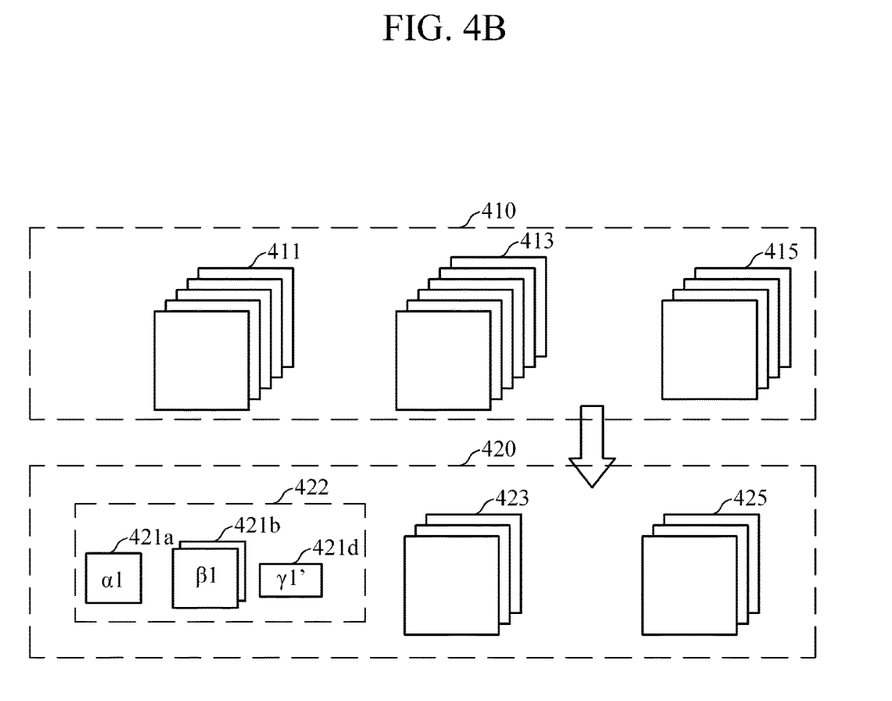

Referring to FIGS. 2, 4A, and 4B, the filter count changer 220 reduces the number of output reconstruction filters γ1 421c of the approximated first convolution layer 421. If five output reconstruction filters γ1 421c were to have resulted from the approximation of the first convolution layer 421, the filter count changer 220 may reduce the number of output reconstruction filters γ1 421c to 3. Reference numeral 421d denotes the resulting output reconstruction filters γ1'.

The layer structure modifier 250 may modify structures of the second convolution layer 413 and the third convolution layer 415. In the illustrated example, the layer structure changer 250 may change the number of convolution filters in the second convolution layer 413 from 6 to 3 and change that of the third convolution layer 415 from 4 to 3. Reference numeral 423 denotes the resulting second convolution layer, and reference numeral 425 denotes the resulting third convolution layer.

The training processor 230 fixes the input conversion filter α1 421a and convolution filters β1 421b, and trains the structure-modified CNN 420.

Figure 4C:
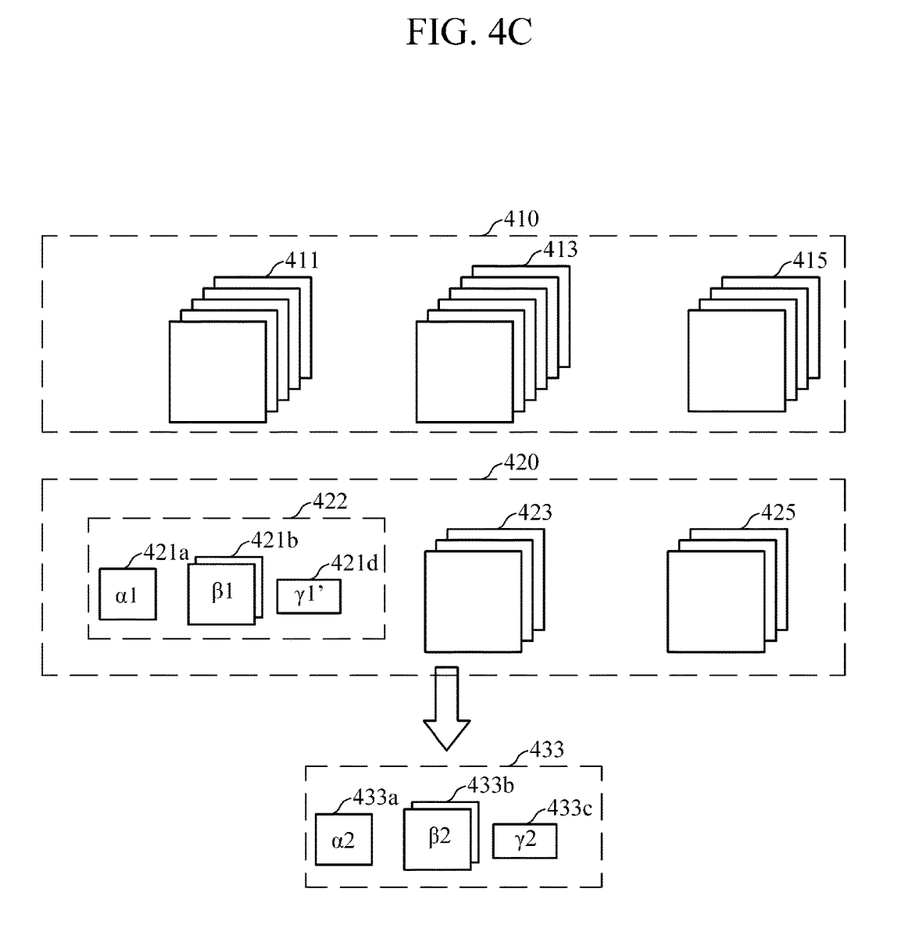

Referring to FIGS. 2 and 4C, when the modified CNN 420 has been fully trained by the training processor 230, the approximation processor 210 approximates the second convolution layer 423 of the modified CNN 420 into an input conversion filter α2 433a, two convolution filters β2 433b, and an output reconstruction filter γ2 433c by use of a low-rank approximation. At this time, a user may set the number of the resulting convolution filters β2 433b to be less than the number of convolution filters of the second convolution layer 423.

Figure 4D:
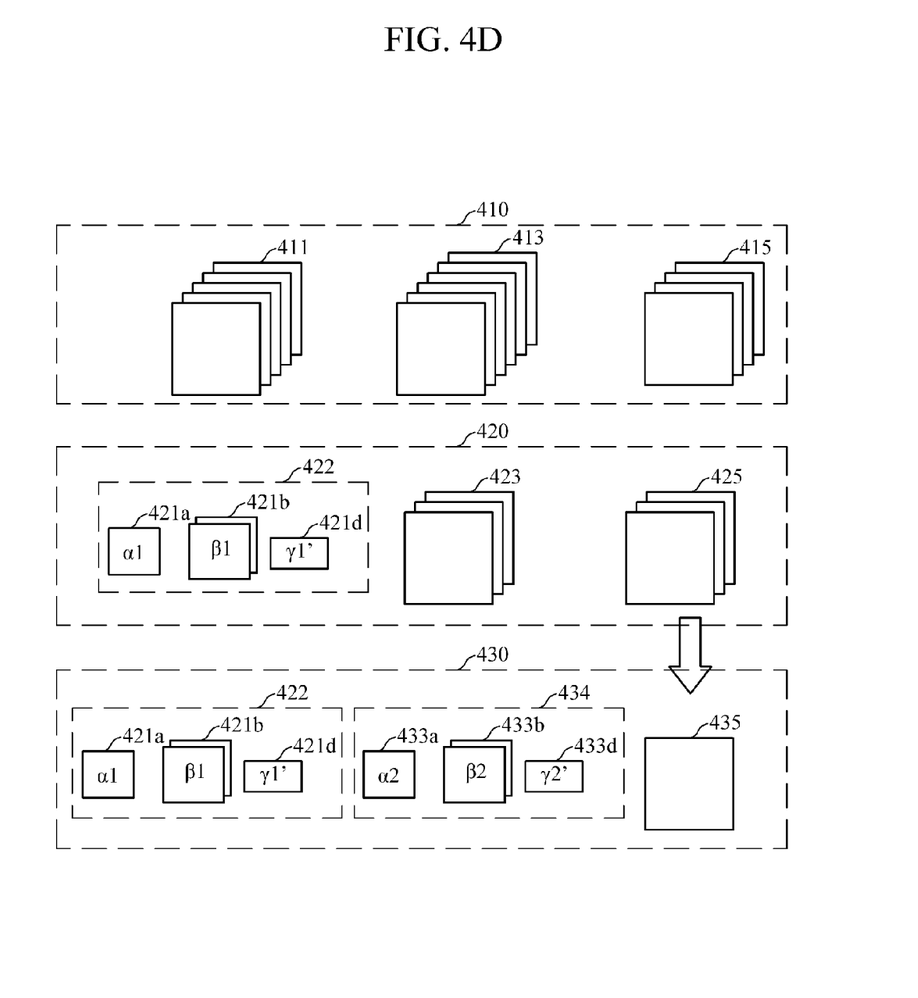

Referring to FIGS. 2, 4C, and 4D, the filter count changer 220 reduces the number of the output reconstruction filters γ2 433c of the approximated second convolution layer 433. For example, if six output reconstruction filters γ2 433c were to have resulted from the approximation of the second convolution layer 433, the filter count changer 220 may reduce the number of the output reconstruction filters γ2 433c to 4. Reference numeral 433d denotes the resulting output reconstruction filters γ2'.

The layer structure modifier 250 changes the structure of the third convolution layer 425 of the CNN 420. In the illustrated example, the layer structure modifier 250 changes the number of convolution filters of the third convolution layer 425 from 3 to 1.

The training processor 230 fixes the first convolution layer 422, the input conversion filter α2 433a, and the convolution filters β2 433b, and trains the structure-modified CNN 430.

In the example, it is illustrated that approximation, changes in the output reconstruction filter count, and the training process are not performed for the final convolution layer, i.e., the third convolution layer 435. However, aspects of the present disclosure are not limited thereto, such that the training apparatus 200 may only perform approximation on the third convolution layer 435, or perform all operations on the third convolution layer 435, said operations being approximation, changing the output reconstruction filter count, and the training process.

On the other hand, the training apparatus 200 may not perform approximation, changing the output reconstruction filter count, and the training process for the first convolution layer but may perform these operations only for the second and third convolution layers.

Before any training of the CNN takes place, the training apparatus 200 may skip the process of modifying the structures of the second and third convolution layers even though the first convolution layer has been approximated, or it may modify the structure of either the second convolution layer or the third convolution layer but not both.

Figure 5:
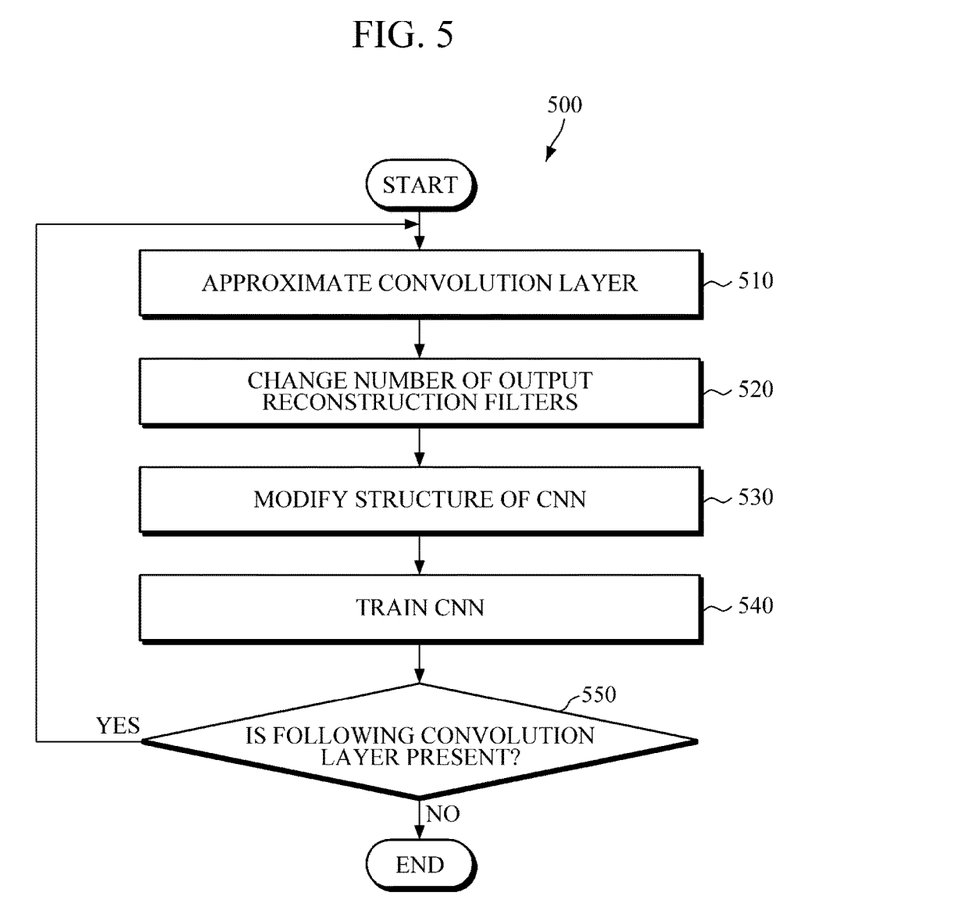
FIG. 5 is a flowchart illustrating an example of a method of training a CNN.

FIG. 5 is a flowchart illustrating an example of a method for training a CNN. The method 500 is performed by a CNN approximation apparatus.

Referring to FIG. 5, the method 500 for training a CNN (hereinafter, referred to as a "training method") begins with an approximation of a convolution layer of the CNN by applying a low ranking approximation method as depicted in 510.

For example, the approximation processor 210 of the training apparatus 200 may approximate convolution filters w of the convolution layer into at least one input conversion filter α, at least one convolution filter β, and at least one output reconstruction filter γ using a low-rank approximation. The purpose of the input conversion filter α is to reduce the number of channels of input image data, while the purpose of the convolution filter β is to generate feature maps by convolving the input image data with a reduced number of channels. In addition, the output reconstruction filter γ restores the number of channels of the feature maps generated by the convolution filter β to the same number as the number of channels of the output image data from the convolution filters w.

In this case, the number of input conversion filters α and the number of convolution filters β may be set beforehand by the user.

After the approximation, the number of output reconstruction filters γ of the approximated convolution layer may be reduced in 520 by the filter count changer 220 of the training apparatus 200. For example, if the approximated convolution layer were to have six output reconstruction filters γ, the training apparatus 200 may reduce output reconstruction filter count γ to a number that is between 1 and 5.

Thereafter, based on the approximation result and the result of changing the number of output reconstruction filters γ, the layer structure modifier 230 of the training apparatus 200 modifies the structure of the CNN in 530, and then the training processor 240 trains the structure-modified CNN in 540. The training apparatus 200 can fix values of the input conversion filter α and convolution filter β, and trains the structure-modified CNN.

Once it is determined that there are more convolution layers queued up after the approximated convolution layer as depicted in 550, the process flow returns to operation 510 and sequentially performs operations 510, 520, 530, and 540 for each of these following convolution layers.

Figure 6:
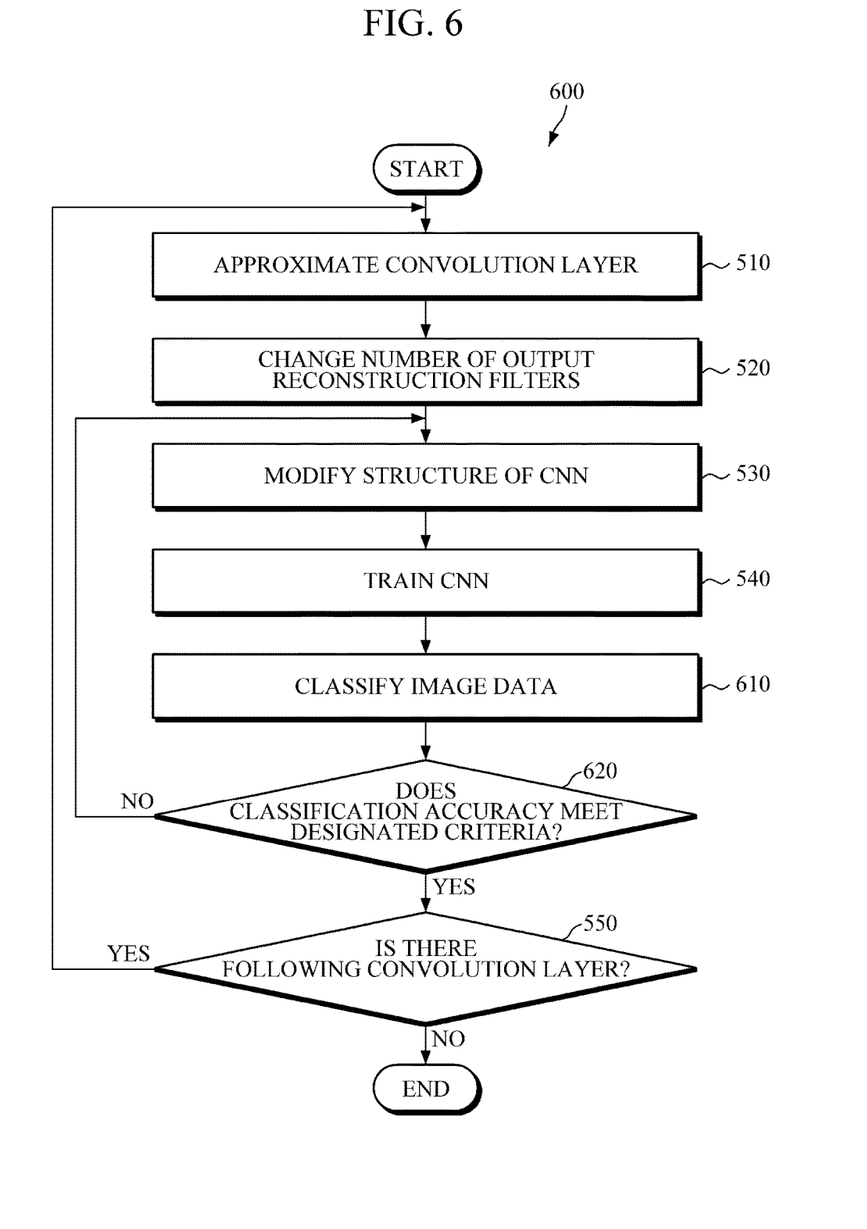
FIG. 6 is another example of a method of training a CNN.

FIG. 6 is another example of a method for training a CNN of the approximation thereof (hereinafter, referred to as a "training method").

Referring to FIG. 6, in addition to the operations of the training method of FIG. 5, the training method 600 may further include operations 610 and 620 performed by the classifier 250 of the training apparatus 200, wherein in 610, image data is classified using the trained CNN, and in 620, it is determined whether the classification accuracy meets the designated criteria.

In 610, the image data is classified using a trained and structurally modified CNN. Then, it is determined whether or not the classification accuracy meets the designated criteria as depicted in 620, and if it does not, operations 520 to 540 are performed again.

In the event that the training apparatus 200 were to classify image data using the trained and structurally modified CNN and the classification accuracy does not meet the designated criteria, the training apparatus 200 may do the following: 1) re-change the number of output reconstruction filters γ to be less than the number of output reconstruction filters γ resulting from the approximation, 2) re-modify the structure of the CNN based on the re-changed number of output reconstruction filters γ, and 3) train the re-modified CNN.

In the training method 600, if it is determined in 620 that the classification accuracy meets the criteria, the process flow proceeds to operation 550.

Figure 7:
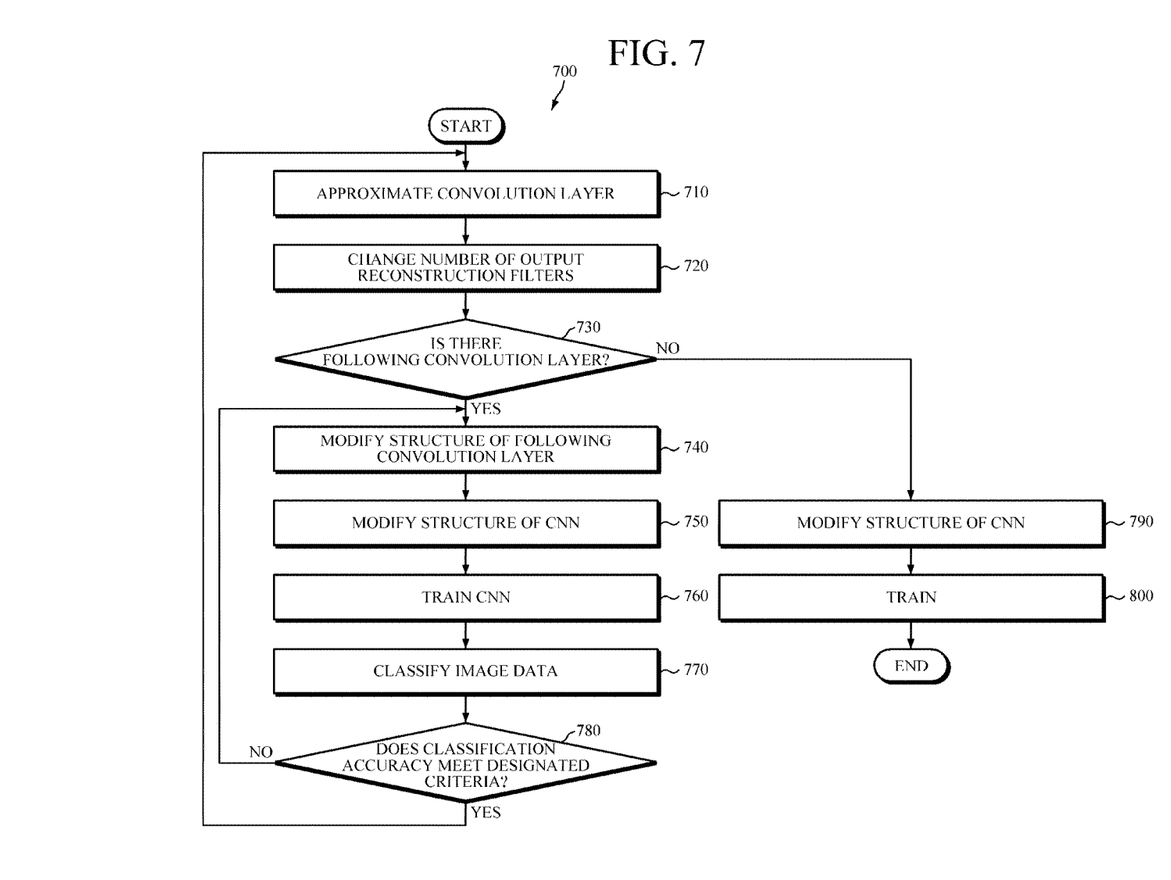
FIG. 7 is another example of a method of training a CNN.

FIG. 7 is another example of a method for training a CNN of the approximation thereof (hereinafter, referred to as a "training method").

Referring to FIG. 7, the training method 700 begins with the approximation of a CNN convolution layer by using a low-rank approximation as depicted in 710.

The training apparatus 200 may approximate convolution filters w of a convolution layer into at least one input convolution filter α, at least one convolution filter β, and at least one output reconstruction filter γ using a low-rank approximation. In this case, the number of input conversion filters α and the number of convolution filters β may be set beforehand by the user.

In 720, the number of output reconstruction filters γ of the approximated convolution layer may be reduced. For example, if the approximated convolution layer contains six output reconstruction filters γ, the training apparatus 200 may reduce the output reconstruction filter count γ to a number that is between 1 and 5.

Thereafter, in 730, once it is determined that there are more convolution layers queued up after the approximated convolution layer, the training apparatus 200 modifies a structure of the following convolution layer. For example, the training apparatus 200 may modify the structure of the following convolution layer by changing the number of convolution filters of the following convolution layer.

Then, based on the approximation result and the result of changes made to the number of output reconstruction filters γ, the training apparatus 200 modifies the structure of the CNN as depicted in 740 and then trains the CNN in 750. That is, the training apparatus 200 fixes values of the input conversion filter α and convolution filter β, and trains the structure-modified CNN.

Image data is classified using training data of the structurally modified CNN as depicted in 770, and it is determined whether the classification accuracy meets designated criteria in 780.

If it is determined that the classification accuracy does not meet the criteria, operations 740 to 770 are performed again.

If it is determined that the classification accuracy meets the criteria, the process flow returns to operation 710 so that approximation may be carried out on the following convolution layer.

If the determination made in 730 shows that there no following convolution layer queued up, the training apparatus 200 modifies the structure of the CNN based on the approximation result and the result of the change in output reconstruction filter count as depicted in 790, and trains the structure-modified CNN in 800.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

The apparatuses, units, modules, devices, filter count changer, layer structure modifier, classifier, approximation processor, training processor and other components illustrated in FIG. 2 that perform the operations described herein with respect to FIGS. 1, 3, 4A-4D and 5-7 are implemented by hardware components. Examples of hardware components include controllers, sensors, generators, drivers, memories, comparators, arithmetic logic units, adders, subtractors, multipliers, dividers, integrators, image sensors, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1, 3, 4A-4D and 5-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5-7 that perform the operations described herein with respect to FIGS. 1, 3 and 4A-4D are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of training a convolutional neural network (CNN) comprising a plurality of convolution layers stored in a non-transitory memory, the method comprising:
   approximating, using a processor, a convolution layer among the plurality of convolution layers using a low-rank approximation;
   reducing a number of output reconstruction filters of the approximated convolution layer;
   modifying a structure of the CNN based on an approximation result and the reduced number of output reconstruction filters; and
   training the modified CNN,
   wherein one convolution layer among the plurality of convolution layers is approximated into one or more input conversion filters, one or more convolution filters, and one or more output reconstruction filters, and
   wherein the input conversion filter is configured to reduce a number of channels of input data, the convolution filter is configured to perform a convolution operation on input data having the reduced number of channels, and the output reconstruction filter is configured to restore a convolution operation result to have a same number of channels as a number of channels of the convolution layer.

2. The method of claim 1, after the training of the modified CNN, further comprising:
   performing the operations of:
      sequentially approximating convolution layers that follow the approximated convolution layer;
      reducing the number of output reconstruction filters of the currently approximated convolution layer and modifying the structure of the CNN; and
      training the modified CNN.

3. The method of claim 1, after the training of the modified CNN, further comprising:
   classifying image data using the trained CNN; and
   in response to an accuracy of the classification not satisfying a designated criteria, performing the operations of:
      reducing the number of output reconstruction filters;
      modifying the structure of the CNN; and
      training the modified CNN.

4. The method of claim 1, further comprising:
   modifying a structure of at least one convolution layer that follows the approximated convolution layer,
   wherein the structure of the CNN is modified based on a result of the modifying of the structure of said at least one convolution layer.

5. The method of claim 4, wherein the structure of the CNN is modified by changing the number of convolution filters of the at least one convolution layer that follows the approximated convolution layer.

6. The method of claim 4, after the training of the modified CNN, further comprising:
   classifying image data using the trained CNN; and
   in response to an accuracy of the classification not satisfying a designated criteria, performing the operations of:
      modifying the structure of at least one convolution layer that follows the approximated convolution layer;
      modifying the structure of the CNN; and
      training the modified CNN.

7. A non-transitory computer-readable medium storing instructions that, when executed by a computer processor, cause the computer processor to train a convolution neural network stored in a non-transitory memory according to the method of claim 1.

8. An apparatus for training a convolution neural network (CNN) comprising a plurality of convolution layers stored in a non-transitory memory, the apparatus comprising:
   a processor configured to
      approximate a convolution layer among the plurality of convolution layers using a low-rank approximation,
      reduce a number of output reconstruction filters of the approximated convolution layer,
      modify a structure of the CNN based on an approximation result and the reduced number of output reconstruction filters, and
      train the modified CNN,
   wherein the processor is further configured to approximate the convolution layer among the plurality of convolution layers into one or more input conversion filters, one or more convolution filters, and one or more output reconstruction filters, and
   wherein the processor is further configured to reduce a number of channels of input data, perform a convolution operation on input data having the reduced number of channels, and restore a convolution operation result to have a same number of channels as a number of channels of the convolution layer.

9. The apparatus of claim 8, wherein the processor is further configured to sequentially approximate another convolution layer that follows the approximated convolution layer, in response to the modified CNN being trained.

10. The apparatus of claim 8, wherein the processor is further configured to:
    classify image data using the trained CNN; and
    re-change the number of output reconstruction filters in response to an accuracy of the classification not satisfying a designated criteria.

11. The apparatus of claim 8, wherein the processor is further configured to:
    modify a structure of at least one convolution layer that follows the approximated convolution layer based on a result of the modifying of the structure of the convolution layer that follows the approximated convolution layer.

12. The apparatus of claim 11, wherein the processor is further configured to modify the structure of the at least one convolution layer by changing a respective number of convolution filters of said at least one convolution layer.

13. The apparatus of claim 11, wherein the processor is further configured to:
    classify image data using the trained CNN; and
    re-modify the structure of the at least one convolution layer that follows the approximated convolution layer in response to an accuracy of the classification not satisfying a designated criteria.

14. An apparatus for training a neural network, the apparatus comprising:
    a non-transitory memory storing a convolution neural network (CNN) comprising a plurality of convolution layers; and
    a processor configured to
       approximate a convolution layer from among the plurality of convolution layers using a low-rank approximation,
       reduce a number of output reconstruction filters of the approximated convolution layer, modify a structure of the CNN based on a result of the approximating of the convolution layer and the reduced number of output reconstruction filters, and train the modified CNN stored in the non-transitory memory, wherein the processor is further configured to classify input image data retrieved from a training data memory storage by using the modified CNN, and further modify the modified CNN in response to an accuracy of the classification not satisfying a designated criteria.

15. The apparatus of claim 14, wherein the apparatus trains the modified CNN by retrieving input image data from a training data memory storage.

* * * * *